US010931510B2

(12) United States Patent
Rayrole et al.

(10) Patent No.: US 10,931,510 B2
(45) Date of Patent: Feb. 23, 2021

(54) SYSTEM FOR SYNCHRONIZING A SET OF INTERCONNECTED AVIONICS DEVICES WITH COMMUNICATION NETWORK OF A VEHICLE

(71) Applicants: THALES, Courbevoie (FR); CENTRALESUPELEC, Gif sur Yvette (FR)

(72) Inventors: Martin Rayrole, Velizy-Villacoublay (FR); Michaël Templier, Toulouse (FR); Eric Fitterer, Merignac (FR); Dominique Marcadet, Gif sur Yvette (FR); Frédéric Boulanger, Gif sur Yvette (FR); Safouan Taha, Gif sur Yvette (FR)

(73) Assignees: THALES, Courbevoie (FR); CENTRALESUPELEC, Gif sur Yvette (FR)

( * ) Notice: Subject to any disclaimer, the term of this patent is extended or adjusted under 35 U.S.C. 154(b) by 0 days.

(21) Appl. No.: 16/647,839

(22) PCT Filed: Sep. 21, 2018

(86) PCT No.: PCT/EP2018/075704
§ 371 (c)(1),
(2) Date: Mar. 16, 2020

(87) PCT Pub. No.: WO2019/057941
PCT Pub. Date: Mar. 28, 2019

(65) Prior Publication Data
US 2020/0267046 A1 Aug. 20, 2020

(30) Foreign Application Priority Data

Sep. 22, 2017 (FR) ...................... 1700972

(51) Int. Cl.
*G06F 1/12* (2006.01)
*H04L 12/24* (2006.01)
(Continued)

(52) U.S. Cl.
CPC ................ *H04L 41/06* (2013.01); *G06F 1/12* (2013.01); *G06F 1/14* (2013.01); *G06F 11/1679* (2013.01);
(Continued)

(58) Field of Classification Search
CPC .......... G06F 1/12; G06F 1/14; G06F 11/1679; G06F 11/3476; G06F 9/4887;
(Continued)

(56) References Cited

U.S. PATENT DOCUMENTS 5,604,754 A 2/1997 Itskin et al.
2005/0110678 A1* 5/2005 Doi ........................ H04B 17/20
342/372
(Continued)

OTHER PUBLICATIONS

French Search Report issued by the French Patent Office in corresponding French Patent Application No. 1700972, dated May 25, 2018.
(Continued)

*Primary Examiner* — Le H Luu
(74) *Attorney, Agent, or Firm* — Arent Fox LLP

(57) ABSTRACT

The invention relates to a method for synchronizing interconnected critical devices comprising servers and clients, each critical device being connected to another critical device by a virtual link, each termination of which is associated with a minimum and a maximum value of transmission time for a data packet, the method, implemented periodically, comprising:
the reception of a message at a reception instant, said message comprising at least one time reference determined by a transmitter server,
(Continued)

for each message received, the estimation of the current time of the transmitter server on the basis of: the time reference, a value of the internal clock of the current critical device at the current instant and at the reception instant, the minimum value and the maximum value of transmission time of the virtual link between the transmitter server and the current critical device.

10 Claims, 2 Drawing Sheets

(51) Int. Cl.
    *H04L 29/08*     (2006.01)
    *H04L 29/06*     (2006.01)
    *G06F 1/14*     (2006.01)
    *G06F 11/16*     (2006.01)
    *H04J 3/06*     (2006.01)
    *H04J 3/14*     (2006.01)
    *H04L 12/40*     (2006.01)

(52) U.S. Cl.
    CPC .............. *H04J 3/0664* (2013.01); *H04J 3/14* (2013.01); *H04L 67/1095* (2013.01); *H04L 67/42* (2013.01); *H04L 2012/4028* (2013.01)

(58) Field of Classification Search
    CPC .......... H04J 3/0664; H04J 3/14; H04L 41/06; H04L 67/1095; H04L 67/42; H04L 2012/4028; H04L 65/608; G01S 19/21; G01S 19/48; G04G 7/02; G04R 20/10; G07C 5/008; H04B 17/20; H04W 56/0015; H04W 56/002
    See application file for complete search history.

(56) References Cited

U.S. PATENT DOCUMENTS

| 2005/0193277 | A1* | 9/2005 | Horikawa | G06F 11/3476 |
| | | | | 714/45 |
| 2005/0232219 | A1* | 10/2005 | Aiello | H04W 56/0015 |
| | | | | 370/348 |
| 2006/0047989 | A1 | 3/2006 | Delgado et al. | |
| 2006/0142913 | A1* | 6/2006 | Coffee | G07C 5/008 |
| | | | | 701/29.3 |
| 2010/0088535 | A1 | 4/2010 | Agata | |
| 2011/0075522 | A1* | 3/2011 | Abe | G04R 20/10 |
| | | | | 368/47 |
| 2013/0121399 | A1* | 5/2013 | Eliezer | G04G 7/02 |
| | | | | 375/238 |
| 2014/0306842 | A1* | 10/2014 | Alizadeh-Shabdiz | |
| | | | | G01S 19/48 |
| | | | | 342/357.51 |
| 2015/0205737 | A1* | 7/2015 | Jan | G06F 9/4887 |
| | | | | 710/261 |
| 2017/0142741 | A1* | 5/2017 | Kaur | H04W 56/002 |
| 2017/0170866 | A1* | 6/2017 | Rollet | G01S 19/21 |
| 2018/0026733 | A1* | 1/2018 | Yang | H04L 65/608 |
| | | | | 725/33 |

OTHER PUBLICATIONS

International Search Report and Written Opinion issued by the International Searching Authority in corresponding International Patent Application No. PCT/EP2018/075704, dated Dec. 12, 2018.

\* cited by examiner

SYSTEM FOR SYNCHRONIZING A SET OF INTERCONNECTED AVIONICS DEVICES WITH COMMUNICATION NETWORK OF A VEHICLE

CROSS-REFERENCE TO RELATED APPLICATIONS

This application is a National Stage entry of international Application PCT/EP2018/075704, filed on Sep. 21, 2018, which claims priority to French Patent Application No. 1700972 filed on Sep. 22, 2017. The disclosures of the priority applications are hereby incorporated in their entirety by reference.

The present invention relates to the field of critical computing systems, for example avionics systems on board aircraft.

"Critical computing system" refers to a computing system for which a failure may cause drastic consequences, for example deaths or serious injuries, substantial physical damage, or serious environmental consequences. Such critical computing systems are based on strict partitioning of the computing resources and network resources.

Hereinafter, such critical computing systems correspond to avionics systems.

An avionics system implements avionics functions. An avionics function is for example the computation of flight parameters as a function of measurement signals provided by sensors, the development of control signals for actuators of the aircraft as a function of flight parameters and/or flight controls, the display of flight parameters on a viewer, the display of flight parameters for maintenance, etc.

Within an avionics system, several avionics devices (that is to say, equipment items) are interconnected via a communication network, for example an aircraft ARINC 664-P7 network.

Currently, within such an aircraft ARINC 664-P7 network, there is no robust and precise synchronization mechanism. Indeed, the only time currently shared in an aircraft is based on a mechanism whose precision is in the order of a second, while certain avionics functions, such as the increased integrity of the networks, the reduced processing lag of the messages in the distributed architectures (in particular the $2^{nd}$ generation integrated modular avionics (IMA-2G), the audio/video stream synchronization, the detection of certain attacks on safety, the identification of the root cause of a malfunction of the avionics system, the merging of data from sensors, etc., require a robust shared time reference (that is to say, usable by a "catastrophic"-level function, as defined by document AMJ 25.1309 by the Joint Aviation Authorities and the high precision of which is guaranteed and is in the order of 100 µs at most. According to the current state of the art, the guarantee of such precision is only achievable by adding a synchronization network parallel to the ARINC 664-P7 network, which increases the cost, the weight and the consumption of the avionics system.

One aim of the present invention is to propose a synchronization method within a critical computing system, such as an avionics system, making it possible to improve the robustness and to guarantee a high precision of the shared time reference within a network of this computing system, while avoiding a synchronization mechanism based on a time measurement internal to this same network, such a mechanism being unsuitable for verifying the integrity of this network.

To that end, the invention proposes a method for synchronizing a set of interconnected critical computing devices, in particular avionics devices, with a communication network of a vehicle, such as an aircraft, and each comprising a time management module, the set of critical computing devices comprising at least one plurality of time reference servers, and a plurality of clients, each critical computing device being connected to at least one other critical computing device by a virtual link, each termination point of a virtual link being associated with a minimum value and a maximum value of transmission time for a data packet over the virtual link,
the synchronization method being implemented and reiterated periodically by the time management module of each current critical computing device and comprising at least:
  receiving at least one synchronization message transmitted by a sending server separate from said current critical computing device, each message being associated with a reception instant and comprising at least one time reference determined by the sending server,
  for each received synchronization message, estimating the current time of the sending server from a quintuplet of parameters comprising:
    the time reference,
    a value of the internal clock of the current critical computing device at the current instant,
    a value of the internal clock of the current critical computing device at the reception instant,
    the minimum value and the maximum value of transmission time associated with the virtual link between the sending server and the current critical computing device.
According to other advantageous aspects of the invention, the synchronization method is such that:
  the reiteration period of the method is according to the following relationship:

$$P < \min \left[ \min_{\text{server } s} \left[ \frac{P_R - \max_{\text{server } s'}(G(s', s)) - \max_{\text{server } s'}[WCTT(s', s) \cdot (D(s) + D(s'))]}{M \cdot \left(D(s) + \max_{\text{server } s'} D(s')\right)} \right], \min_{\text{client } c, \text{server } s} \left[ \frac{P_R - G(s, c)}{D(c) + D(s)} \right] - WCTT(s, c) \right],$$

with:
  G(s',s) the time difference between the best (BCTT) and worst (WCTT) theoretical transmission times of a packet transmitted in the virtual link between two servers,
  $P_R$ a precision datum corresponding to the maximum acceptable gap between the time reference of two computer devices,
  D a maximum drift rate of the internal clock of a critical computing device;
  M the number of critical computing devices of said assembly;
  each critical computing device also comprises a module for managing synchronization failure(s) that may be detected during the implementation of said method, and in which the method comprises, during a current period, prior to the reception of at least one synchronization message and the estimate of the current time of the sending server:
  the transmission, by the time management module of the current critical computing device, to its own failure management module, of any information, associated with a module for managing failures of at least one sending server separate from the current critical computing device, and received during the preceding period, the performance of each action, not yet performed, received from its own failure management module, the current critical computing device being a current server from the plurality of servers, each server being connected to each other server and each client by a virtual synchronization link;

during and initialization phase, the method comprises, prior to the reception of at least one synchronization message and the estimate of the current time of the sending server:

the determination of a time reference of the current server by applying a predetermined affine function to the value of the internal clock of the current server at the current moment, the affine function being associated with a factor and a shift, the values of which are initiated beforehand at predetermined initial values, the sending of a synchronization message comprising an identification field representative of the initialization phase of the time management module of the current server and comprising the time reference of the current server;

successively to the estimate of the current time of the sending server carried out, for each received synchronization message comprising an identification field representative of the initialization phase of a separate sending server, and implemented once a first predetermined number of synchronization messages is received, is achieved, the method comprises:

determining a new time reference corresponding to the current maximum time obtained from current times associated with each message, updating the factor and the shift of the affine function as a function of said new time reference, starting the operational phase of the time management module of the current server.

successively to the estimate of the current time of the sending server carried out, for each received synchronization message comprising an identification field representative of the operational phase of a separate sending server, and implemented once a second predetermined number of synchronization messages is received, is achieved, the method comprises:

determining a new time reference corresponding to the current average time obtained from current times associated with each message, updating the factor and the shift of the affine function as a function of said new time reference, starting the operational phase of the time management module of the current server.

the current critical computing device being a current server from the plurality of servers, each server being connected to each other server and each client by a virtual synchronization link, during the operational phase, the method comprises:

for each received synchronization message comprising an identification field representative of the operational phase of a separate sending server:

if the reception instant of the message is more than two periods earlier than the current instant, sending a piece of information representative of an anomaly to the failure management module of the current client and stopping of the processing of the message, otherwise, said estimate of the current time associated with said message determining a new time reference corresponding to the current average time obtained from the current time of the current server and current times associated with each message, updating the factor and the shift of the affine function as a function of said new time reference, and the sending of a synchronization message comprising an identification field representative of the operational phase of the current server and containing said time reference of the current server;

the current critical computing device being a current client from the plurality of clients, each client being connected to each server of the plurality of servers by a virtual synchronization link, during an initialization phase, successively to the estimate of the current time of the sending server implemented from the first received synchronization message comprising an identification field representative of the operational phase of a separate sending server, the method comprises:

updating the time reference of the current client equal to the current time associated with said message, initializing initial factor and shift values of an affine function applicable to the value of the internal clock of the current client, starting the operational phase of the time management module of the current client.

the current critical computing device being a current client from the plurality of clients, each client being connected to each server from the plurality of servers by a virtual synchronization link, during an operational phase, the method comprises:

for each received synchronization message comprising an identification field representative of the operational phase of a separate sending server:

if the reception instant of the message is more than two periods earlier than the current instant, sending a piece of information representative of an anomaly to the failure management module of the current client and stopping of the processing of the message, otherwise, said estimate of the current time associated with said message, if the absolute value of the difference between, on the one hand, a time reference of the current client obtained by applying an affine function to the value of the internal clock of the current client at the current moment, and on the other hand the average current time obtained from current times associated with each message is above a predetermined precision threshold, the sending of information representative of an anomaly to the failure management module of the current client, determining a new time reference corresponding to the current average time obtained from current times associated with each message, and updating the factor and the shift of the affine function of the current client as a function of said new time reference.

The invention also relates to a computer program including software instructions which, when executed by a computer, implement the synchronization method as defined above.

The invention also relates to a system for synchronizing a set of interconnected critical computing devices, in particular avionics devices, with a communication network of a vehicle, such as an aircraft, and each comprising a time management module, the set of critical computing devices comprising at least one plurality of time reference servers, and a plurality of clients, each critical computing device being connected to at least one other critical computing device by a virtual link, each termination point of a virtual link being associated with a minimum value and a maximum value of transmission time for a data packet over said virtual link, the time management module of each current critical computing device being able to carry out and periodically reiterate at least:

receiving at least one synchronization message transmitted by a sending server separate from said current critical computing device, each message being associated with a reception instant and comprising at least one time reference determined by said sending server, for each received synchronization message, estimating the current time of the sending server from a quintuplet of parameters comprising:

said time reference, a value of the internal clock of the current critical computing device at the current instant, a value of the internal clock of the current critical computing device at the reception instant, the minimum value and the maximum value of transmission time associated with the virtual link between the sending server and the current critical computing device.

These features and advantages of the invention will appear more clearly upon reading the following description, provided solely as a non-limiting example, and done in reference to the appended drawings, in which.

Figure 1:
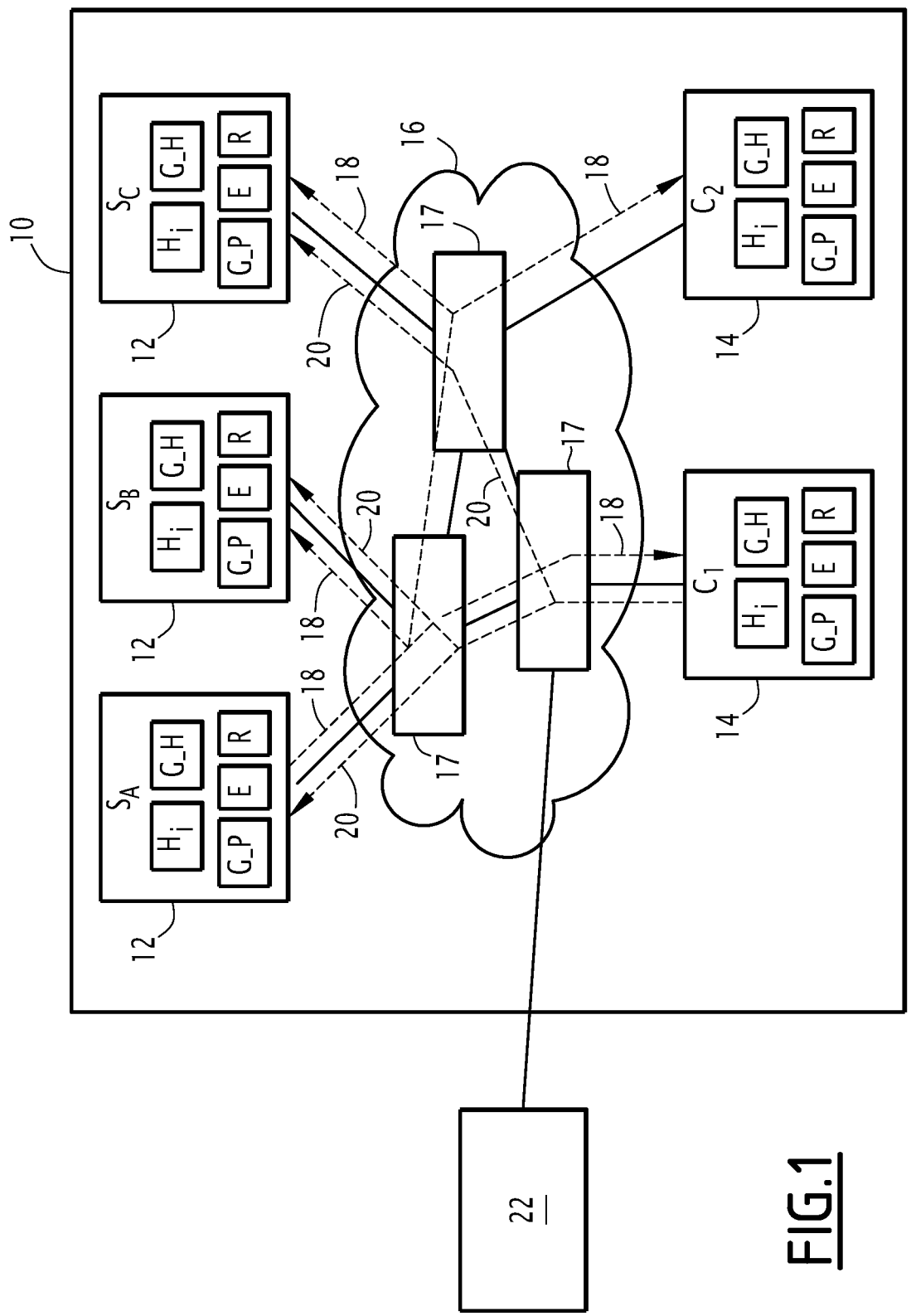
FIG. 1 is a schematic illustration of a synchronization system according to the invention.

The synchronization system 10 illustrated in FIG. 1 is for example embedded in an aircraft, not shown. The synchronization system 10 is configured to exchange a time reference between, on the one hand, a plurality of M (M≥2) critical computing devices corresponding here to avionics devices, called servers 12, such as the three servers $S_A$, $S_B$ and $S_C$, and on the other hand a plurality of Q (Q≥2) critical computing devices, here corresponding to avionics devices, called clients 14 $C_1$ and $C_2$.

In particular, an avionics server 12 or client 14 device is an avionics computer able to execute software, while guaranteeing a strict spatial and temporal partitioning of these software applications. This partitioning is for example implemented by an operating system according to standard ARINC 653.

According to one particular aspect, a same avionics device is able to operate both as a server 12 (that is to say, to implement the specific steps of the synchronization method associated with the "server" type of avionics device) and as client 14 (that is to say, to implement the specific steps of the synchronization method associated with the "client" type of avionics device).

Servers 12 and clients 14 are connected to a communication network 16, for example an avionics communication network according to standard ARINC A664-p7, and preferably made redundant.

More specifically, the network 16 comprises a plurality of network switches 17.

Additionally, according to a predefined and static architecture of the network, the data streams exchanged between the various server or client avionics devices are separated using a strict segregation.

In particular, for each server 12, for example the server $S_A$, a dedicated virtual link (VL) 18, said to be for synchronization, connects this server 12, via the network switches 17, to all of the other servers 12 $S_B$ and $S_C$ and all of the clients $C_1$ and $C_2$. Such virtual synchronization links 18 are able to transport clock synchronization messages.

Similarly, for each client 14, for example the client $C_1$, a dedicated virtual link 20, said to be for control, connects this client 14 to all of the servers 12 $S_A$, $S_B$ and $S_C$.

In particular, via such a virtual control link, each client 14 is able to request the restart of the synchronization method according to the invention, or the reset of the shared time reference. Associated with each of these commands is the instant, according to the time reference, where the command must be executed by the servers 12.

According to one specific aspect, a command is only taken into account by the servers if it is confirmed by the reception of a command of the same type sent by at least one other client in a predefined length of time.

According to one specific aspect, the virtual synchronization links 18 are configured with a higher priority level than all of the other virtual links implemented by the network 16, in particular the virtual control links 20.

Additionally, each avionics server 12 or client 14 device contains at least the following elements: an internal clock $H_i$, a time management module G_H able to carry out the method according to the invention and corresponding to the point of origin and/or respectively the recipient of the virtual synchronization 18 and control 20 links, a failure management module G_P dedicated to managing failures detected during the implementation of the method according to the invention, a network sending module E whose transmission time of a message from the partition (within the meaning of standard ARINC 653) until its sending over the network 16 is known and fixed (no jitter (that is to say, latency variation)), a network receiving module R, in which each received packet is able to be timestamped with the internal clock $H_i$ of the avionics device, once it is received by the input port connected to the network 16 A664-p7.

The time management G_H and failure management G_P modules are for example implemented, in each of the servers 12 or client 14, by software hosted in one or several partition (s).

In a variant, all or some of the time management G_H and failure management G_P modules are able to be implemented using one or several programmable logic circuit(s), such as an FPGA (Field Programmable Gate Array), or in the form of a dedicated integrated circuit, such as an ASIC (Application Specific Integrated Circuit) mounted on an electronic board embedded in the avionics device in question.

According to the present invention, a message sent over a virtual synchronization link 18 in particular comprises four separate fields, namely:

a field dedicated to a version number of the protocol for example corresponding to an integer over four bits, an identification field of the message type depending on whether the synchronization method implemented in the considered avionics device is in the initialization phase INIT or in the operational phase TIME, encoded for example by an integer over four bits, a notification field sent by the failure management module of the sending server, for example $S_B$, to the failure management module of each of the other servers, for example the servers $S_A$ and $S_C$, such a field being able to assume a nil value representative of the absence of notification, or any other value depending on the internal operation of the failure management modules representative of the first notification sent by the failure management module and not yet transmitted over said virtual synchronization link 18, encoded for example by an integer over a byte, and a field dedicated to the insertion of the time reference Href calculated by the server that sends the message, for example the time reference $Href_B$ calculated by the server $S_B$, encoded for example by an integer over eight bytes indicating the number of microseconds elapsed since the reset of this counter.

During the design of the communication network 16, a configuration platform 22 is able to determine, for each termination point (that is to say, a server 12 or a client 14) of a virtual synchronization link 18, the best BCTT and worst WCTT theoretical transmission times of a packet received in the virtual link in question between two avionics devices, whether it is a pair of two servers or pair comprising a server and a client.

These parameters BCTT and WCTT associated with a given virtual link 18 as well as other predetermined configuration data are integrated into the configuration files of each avionics device of the embedded synchronization system 10 and/or in a file stored within the configuration platform 22. The other configuration data in particular include: the number N of servers 12 necessary to guarantee the robustness of the time reference determined and shared within the ARINC A664-p7 network 16, a maximum drift level D of the internal clock $H_i$ of a considered avionics device 12 or 14 relative to an exact theoretical time (this level is a characteristic datum of the electronic components implanted in the avionics device), a precision datum $P_R$ corresponding to the maximum acceptable gap between the time reference of two clients, for example, or the predetermined value of the synchronization period P, the method according to the invention being implemented periodically according to this period P by each time management module G_H whether it is comprised in an avionics device corresponding to a server 12 or to a client 14, etc.

In particular, in order to guarantee the reliability of the value of the precision datum $P_R$, the configuration platform 22 is able to verify that the period P is according to the following relationship:

$$P < \min \left[ \min_{server\ s} \left[ \frac{P_R - \max_{server\ s'} (G(s', s)) - \max_{server\ s'} [WCTT(s', s) \cdot (D(s) + D(s'))]}{M \cdot \left(D(s) + \max_{server\ s'} D(s')\right)} \right], \min_{client\ c, server\ s} \left[ \frac{P_R - G(s, c)}{D(c) + D(s)} \right] - WCTT(s, c) \right]$$

with G(s',s) the time difference between the best (BCTT) and worst (WCTT) theoretical transmission times of a packet transmitted in the virtual link by a server s' toward a server s.

Furthermore, each time management module G_H is able to detect a synchronization anomaly, for example a difference between its own time reference and that of another server that is too great to guarantee the precision $P_R$, and to report it to the failure management module G_P of the avionics device to which the time management G_H and failure management G_P modules both belong.

In response, the failure management module G_P is able to indicate, to the time management module G_H, a sequence of actions to be executed in reaction to this synchronization anomaly. The correspondence between the detected type of synchronization anomaly and the sequence of actions to be executed is also a configuration datum able to be stored in a configuration file of each considered avionics device and depends on the security architecture of the overall critical computing system and the use(s) of the time reference.

Such an action is for example restarting the time management module G_H, or the broadcasting, by the time management module G_H, of a piece of information representative of this anomaly, also called notification, to the other servers 12, or the exclusion of a server 12 to be taken into account in order to carry out the synchronization method according to the invention, or the stopping of the implementation of the synchronization method according to the invention, etc.

Figure 2:
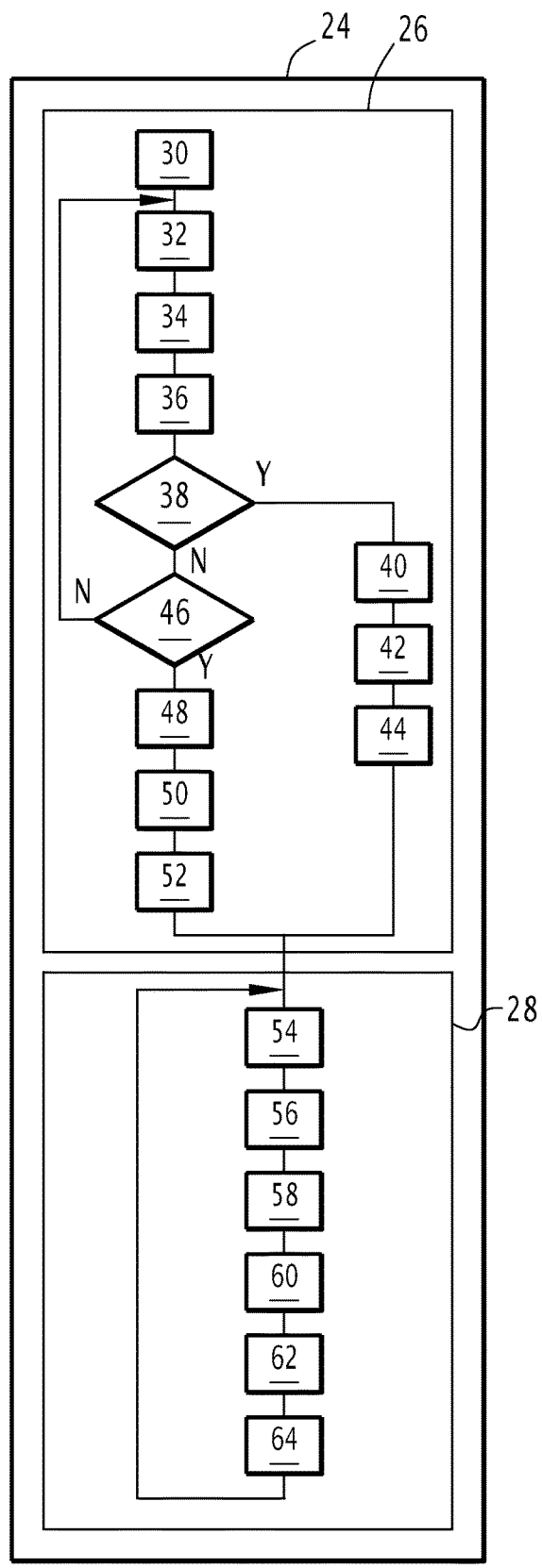
FIG. 2 is a flowchart of a synchronization method according to a first embodiment of the invention where the computing device implementing the method is a server.
Figure 3:
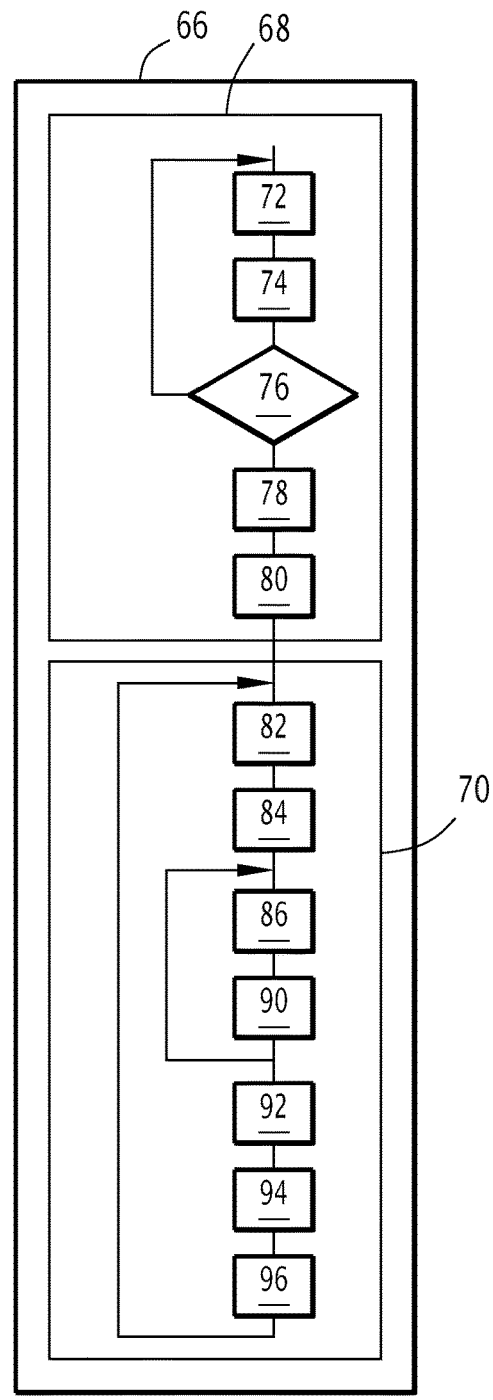
FIG. 3 is a flowchart of a synchronization method according to a second embodiment of the invention where the computing device implementing the method is a client.

The synchronization method implemented by each avionics device, server 12 or client 14, of the synchronization system 10 of FIG. 1 will now be described in more detail in reference to FIG. 2 when the avionics device is a server 12, and in reference to FIG. 3 when the avionics device is a client 14.

As disclosed hereinafter in relation with FIG. 2 or FIG. 3, whether the avionics device is a server 12 or client 14, these two types of avionics devices of the synchronization system 10 both periodically implement two essential steps, namely a step for receiving at least one synchronization message transmitted by a sending server 12 (for example $S_B$) separate from the current critical computing device (server 12, for example $S_A$, or client 14, for example $C_1$), each message being associated with a reception instant ti with i the index of the sending server and comprising at least one time reference $Href_B$ determined by the sending server (for example $S_B$), and for each received synchronization message, a step for estimating the current time $Hc_i$ of the sending server (for example $S_B$) from a quintuplet of parameters comprising:

the time reference $Href_i$ with i the index of the sending server, for example $Href_B$ for the sending server $S_B$.

a value $h_{int\ tc\ di}$ of the internal clock of the current critical computing device di at the current instant tc, the current instant tc being able to increase over the time that elapses and corresponding to the current implementation instant of a step of the method according to the invention.

a value $h_{int\ ti\ di}$ of the internal clock of the current critical computing device di at the reception instant ti, the minimum value $BCTT(S_i, d_i)$ and the maximum value $WCTT(S_i, d_i)$ of transmission time associated with the virtual link VL between the sending server $S_i$, for example the sending server $S_B$, and the current critical computing device $d_i$.

Additionally, whether the avionics device is a server 12 or a client 14, these two types of avionics device of the synchronization system 10 implement, during a current period, before receiving at least one synchronization message and upon estimating the current time $Hc_B$ of the sending server $S_B$:

the transmission, by the time management module of the current critical computing device, to its own failure management module G_P, of any information, associated with a module for managing failures G_P of at least one sending server separate from the current critical computing device, and received during the preceding period, the performance of each action, not yet performed, received from its own failure management module G_P.

In other words, the present invention takes advantage of specific features of critical partitioned systems, namely the predefined and static configuration of the communication network 16, the strict segregation of the data streams exchanged within this communication network 16, and the master of the network crossing times using the theoretical calculation implementing during the design of the network 16 to determine the crossing time of a data packet of a virtual link 18, which makes it possible to avoid the use of statistical methods, such as, for example, those associated with the PTP protocol (Precision Time Protocol) (IEEE 1588), which are unsuitable for critical computing systems such as avionics systems, also using a segregation of the streams within an A664-P7 network, since the precision of the time cannot be formally guaranteed due to the statistical approach used.

Additionally, the present invention is based on the use of a plurality of servers able to define a precise common time reference, which makes the synchronization implemented according to the invention robust.

Indeed, the use of a single server is not suitable for determining a time reference usable for a critical computing function such as an avionics function.

Additionally, the present invention makes it possible to avoid altering the operation of the network switches 17, which makes it possible to carry out the method according to the invention within existing communication networks 16.

In relation with FIG. 2, the synchronization method 24 implemented when the avionics device corresponds to a server 12 is disclosed hereinafter.

Such a synchronization method 24 implemented by the server comprises two phases, namely an initialization phase 26 and an operational phase 28.

In the initialization phase 26, the synchronization method 24 implemented by a current server 12, for example $S_A$, comprises a first step 30 for initializing parameters of a predetermined affine function in order to obtain the reference time Href associated with the server 12 $S_A$.

In particular, for each server $S_i$, these parameters correspond to a factor $coeff_{si}$ initialized at one and an offset $offset_{si}$ initialized opposite the internal clock value with the initialization instant $-h_{int\_tinit\_Si}$.

Then for each period P, according to a step 32, the time management module G_H of the current server $S_A$ implements the transmission to its own failure management module G_P of any information (that is to say, notification or notification field), associated with a failure management module G_P of at least one sending server separate from the current server $S_A$, and received during the previous period.

As previously indicated, this step 32 is followed by step 34 for performing each action, not yet performed, received from its own failure management module G_P.

Once these steps 30 to 34 have been performed, the server in the initialization phase 26 carries out a step 36 for determining the time reference $Href_A$ of the current server $S_A$ by applying the predetermined affine function to the value of the internal clock of the current server at the current moment $t_c$, such that:

$$Href_A(t_c) = coeff_A \cdot h_{int\_tc\_SA} + Offset_A = h_{int\_tc\_SA} - h_{int\_tinit}.$$

According to step 36, the current server $S_A$ next sends a synchronization message comprising an identification field representative of the initialization phase of the time management module of the current server $S_A$, namely for example INIT, and comprising the time reference of the current server $S_A$, that is to say $Href_A$.

Then, two variants of the initialization phase are carried out depending on the type of synchronization message received, INIT or TIME, and as a function of the number of synchronization messages, in other words as a function of the number of separate servers sending a synchronization message.

According to a first variant, if, according to a step 38, the current server $S_A$ has received at least one message INIT from at least (N−1) separate servers since the entry into the initialization phase 26, then for each last message INIT received from separate servers (message received from the server $S_i$ for example corresponding to $S_B$ or $S_C$, at the instant $t_i$, and containing the time reference $Href_i$), the time management module of the current server $S_A$, according to a step 40, carries out the estimate of the current time of the sending server, for example $S_B$, according to the following equation of the current incident $t_c$:

$$Hc_B = Href_B + h_{int\_tc\_SA} - h_{int\_ti\_SA} + (BCTT(S_B,S_A) + WCTT(S_B,S_A))/2.$$

Then this step 40 is followed by a step 42 for determining the maximum value among the current times of the estimated sending servers, for example in relation with FIG. 1, the maximum value Hmax of the current times $Hc_B$ and $Hc_C$ respectively associated with the sending servers $S_B$ and $S_C$.

The following step 44 serves to use the value Hmax as new time reference $NHref_A$ associated with the server $S_A$. To that end, during this step 44, the time management module implements the update (that is to say, correction) of the new parameters $Ncoeff_A$ and $Noffset_A$ of the affine function associated with the server $S_A$ according to the following equations and to be sued during the following period P:

$$N\,coeff_A = 1 + (NHref_A - Href_A)/P,\ et\ Noffset_A = offset_A + (coeff_A - N\,coeff_A) \cdot h_{int\_tc\_SA}.$$

Once this step 44 is implemented, the operational phase 28 is started in the following period P.

According to a second variant, if, according to a step 46, the current server $S_A$ has received at least one message TIME (that is to say, representative of the operational phase 28) from at least N separate servers since the entry into the initialization phase 26, then for each last message TIME received from separate servers (message received from the server $S_i$ for example corresponding to $S_B$ or $S_C$, at the instant $t_i$, and containing the time reference $Href_i$), the time management module of the current server $S_A$, according to a step 48, carries out the estimate of the current time of the sending server, for example $S_B$, according to the following equation of the current incident $t_c$:

$$Hc_B = Href_B + h_{int\_tc\_SA} - h_{int\_ti\_SA} + (BCTT(S_B,S_A) + WCTT(S_B,S_A))/2,$$

otherwise steps 32 to 38 of the method previously disclosed are reiterated in the following period P, until the condition of step 38 is satisfied, namely the reception of at least one message INIT from at least (N−1) separate servers from the entry into the initialization phase 26, or while the condition associated with step 46, namely the reception of at least one message TIME (that is to say, representative of the operational phase 28) from at least N separate servers from the entry into the initialization phase 26.

Then this step 48 is followed by a step 50 for determining the average value of the current times of the estimated sending servers, for example in relation with FIG. 1, the average value Hmoy$_s$ of the current times Hc$_B$ and Hc$_C$ respectively associated with the sending servers S$_B$ and S$_C$.

The following step 52 serves to use the value Hmoy$_s$ as new time reference NHref$_A$ associated with the server S$_A$. To that end, during this step 52, the time management module implements the update (that is to say, correction) of the new parameters Ncoeff$_A$ and Noffset$_A$ of the affine function associated with the server S$_A$ according to the following equations and to be sued during the following period P:

$$N\,coeff_A = 1 + (NHref_A - Href_A)/P, \text{ et } Noffset_A = offset_A + (coeff_A - N\,coeff_A) \cdot h_{int\_tc\_SA}.$$

Once this step 52 is implemented, the operational phase 28 is started in the following period P.

When the current server S$_A$ is in the operational phase 28, in each period P, the synchronization method comprises a step 54, during which the time management module G_H of the current server S$_A$ implements the transmission to its own failure management module G_P of any information (that is to say, notification or notification field), associated with a failure management module G_P of at least one sending server separate from the current server S$_A$, and received during the previous period.

As previously indicated, this step 54 is followed by step 56 for performing each action, not yet performed, received from its own failure management module G_P.

Then according to a step 58, for each last message TIME received from separate servers (message received from the server S$_i$ for example corresponding to S$_B$ or S$_C$, at the instant t$_i$, and containing the time reference Href$_i$), the time management module of the current server S$_A$ in the operational phase 28 implements:

if the reception instant of the message is more than two periods earlier than the current instant, sending a piece of information representative of an anomaly to the failure management module of the current client and stopping of the processing of the received message TIME, otherwise the estimate of the current time of the sending server, for example S$_B$ according to the following equation at the current instant t$_c$:

$$Hc_B = Href_B + h_{int\_tc\_SA} - h_{int\_ti\_SA} + (BCTT(S_B, S_A) + WCTT(S_B, S_A))/2.$$

Then this step 58 is followed by a step 60 for determining the average value of h$_{int\_tc\_SA}$ and of the current times of the estimated sending servers, for example in relation with FIG. 1, the average value Hmoy$_s$ of h$_{int\_tc\_SA}$ and the current times Hc$_B$ and Hc$_C$ respectively associated with the sending servers S$_B$ and S$_C$.

The following step 62 serves to use the value Hmoy$_s$ as new time reference NHref$_A$ associated with the server S$_A$. To that end, during this step 62, the time management module implements the update (that is to say, correction) of the new parameters Ncoeff$_A$ and Noffset$_A$ of the affine function associated with the server S$_A$ according to the following equations and to be sued during the following period P:

$$N\,coeff_A = 1 + (NHref_A - Href_A)/P, \text{ et } Noffset_A = offset_A + (coeff_A - N\,coeff_A) \cdot h_{int\_tc\_SA}.$$

Once this step 62 is carried out, a step 64 for sending of a synchronization message comprising an identification field TIME representative of the operational phase of the current server and containing the new time reference NHref$_A$ associated with the server S$_A$ is carried out.

In relation with FIG. 3, the synchronization method 66 implemented when the avionics device corresponds to a client 14 is disclosed hereinafter.

Such a synchronization method 66 implemented by the client also comprises two phases, namely an initialization phase 68 and an operational phase 70.

In the initialization phase 68, in each period P, the synchronization method 66 carried out by a current client 14, for example C$_1$, comprises a first step 72 in which the time management module G_H of the current client C$_1$ carries out the transmission to its own failure management module G_P, of any information (that is to say, notification or notification field), associated with a failure management module G_P of at least one sending server, and received during the preceding period.

As previously indicated, this step 72 is followed by step 74 for performing each action, not yet performed, received from its own failure management module G_P.

Then according to a step 76, if a first message TIME (that is to say, representative of the operational phase 28 of a sending server) is received from a server (message received from the server S$_i$ for example corresponding to S$_A$, S$_B$ or S$_C$, at the instant t$_i$, and containing the time reference Href$_i$), the time management module of the current client C1 carries out, according to a step 78, the estimate of the current time of the sending server, for example S$_B$, according to the following equation at the current instant t$_c$:

$$Hc_B = Href_B + h_{int\_tc\_C1} - h_{int\_ti\_C1} + (BCTT(S_B, C_1) + WCTT(S_B, C_1))/2,$$

otherwise steps 72 and 74 for transmitting notification information and action performance are reiterated in the following period P, until a message TIME is received.

The value Hc$_B$ is then selected by the current client C$_1$, according to a step 80, as its new time reference H$_{C1}$=Hc$_B$. To that end, during this step 80, the time management module implements the initialization of parameters of the affine function applicable to the value of the internal clock of the current client C$_1$. These parameters correspond to a factor coeff$_{C1}$ initialized at one and an offset offset$_{C1}$ initialized in the form: offset$_{C1}$=H$_{C1}$−h$_{int\_tc\_C1}$ at the current instant tc of implementation of the initialization step 80.

Once this step 80 is implemented, the operational phase 70 is started in the following period P.

In the operational phase 70 of the current client, the method 66 then comprises, in each period P, a first step 82 in which the time management module G_H of the current client C$_1$ carries out the transmission to its own failure management module G_P, of any information (that is to say, notification or notification field), associated with a failure management module G_P of at least one sending server, and received during the preceding period.

As previously indicated, this step 82 is followed by step 84 for performing each action, not yet performed, received from its own failure management module G_P.

Then, for each last message TIME received by the current client, for example C$_1$, from separate servers (message received from the server S$_i$ for example corresponding to S$_A$, S$_B$ or S$_C$, at the instant t$_i$, and containing the time reference Href$_i$), according to a step 86, if the reception instant t, of the message is more than two periods P before the current instant t$_c$ (in other words if t$_c$−t$_i$>2P), the sending of information representative of an anomaly to the failure management module of the current client and the stopping of the processing of this message is implemented.

Otherwise, the time management module of the current client C$_1$ implements, according to a step 90, the estimate of the current time of the sending server, for example S$_B$ according to the following equation at the current instant t$_c$:

$$Hc_B = Href_B + h_{int\_tc\_C1} - h_{int\_ti\_C1} + (BCTT(S_B, C_1) + WCTT(S_B, C_1))/2.$$

Then, according to a step 92, the time management module of the current client $C_1$ implements the determination of the average value $Hmoy_c$ of the current times $Hc_A$, $Hc_B$ and $Hc_C$ respectively associated with the sending servers $S_A$, $S_B$ and $S_C$.

According to a step 94, if the absolute value of the difference between, on the one hand, the time reference $Href_{C1}$ of the current client obtained by applying an affine function to the value of the internal clock $h_{int\_tc\_C1}$ of the current client $C_1$ at the current moment $t_c$, and on the other hand the average current time $Hmoy_C$ is above a predetermined threshold corresponding to the precision datum $P_R$ of the configuration file of the considered current client, for example $C_1$, while the sending of a piece of information representative of an anomaly (i.e., failure) to the failure management module G_P of the current client $C_1$ is implemented.

In other words, with $Href_{C1} = coeff_{C1} \cdot h_{int\_tc\_C1} + OffSet_{C1}$, if $|Hmoy_C - Href_{C1}| > P_R$, then a failure is indicated by the time management module G_H of the current client $C_1$ to its own failure management module G_P.

Then, according to step 96, the new time reference of the current client $C_1$ $NHref_{C1}$ then corresponds to the average current time $Hmoy_C$ and the update of new values of the parameters $Ncoeff_{C1}$ and $Noffset_{C1}$ of the affine function associated with the current client $C_1$ is implemented according to the following equations and to be used during the following period P:

$N\,coeff_{C1} = 1 + (NHref_{C1} - Href_{C1})/P$, et
$Noffset_{C1} = offset_{C1} + (coeff_{C1} - N\,coeff_{C1}) \cdot h_{int\_tc\_C1}$.

Thus, the synchronization system according to the present invention implements a plurality of servers 12 that define a common precise time. This common time is next sent to the clients 14. The system according to the present invention does not require any specific function of the network switches, which allows both the conservation of the existing network(s), with no hardware or software impact on the network equipment already installed, and improved integrity of the networks, while monitoring the crossing time of the messages.

The invention claimed is:

1. A method for synchronizing a set of interconnected critical computing devices with a communication network of a vehicle, and each comprising a time management module, the set of critical computing devices comprising at least one plurality of time reference servers, and a plurality of clients, each critical computing device being connected to at least one other critical computing device by a virtual link, each termination point of a virtual link being associated with a minimum value and a maximum value of transmission time for a data packet over the virtual link, the synchronization method being implemented and reiterated periodically by the time management module of each current critical computing device and comprising at least:

receiving at least one synchronization message transmitted by a sending server separate from said current critical computing device, each message being associated with a reception instant and comprising at least one time reference determined by the sending server, for each received synchronization message, estimating the current time of the sending server from a quintuplet of parameters comprising:
the time reference,
a value of the internal clock of the current critical computing device at the current instant,
a value of the internal clock of the current critical computing device at the reception instant, and
the minimum value and the maximum value of transmission time associated with the virtual link between the sending server and the current critical computing device.

2. The synchronization method according to claim 1, wherein the reiteration period (P) of the method is according to the following relationship:

$$P < \min\left[\min_{server\,s}\left[\frac{P_R - \max\limits_{server\,s'}(G(s',s)) - \max\limits_{server\,s'}[WCTT(s',s) \cdot (D(s) + D(s'))]}{M \cdot \left(D(s) + \max\limits_{server\,s'} D(s')\right)}\right], \min_{client\,c, server\,s}\left[\frac{P_R - G(s,c)}{D(c) + D(s)}\right] - WCTT(s,c)\right]$$

with:
$G(s',s)$ the time difference between the best and worst theoretical transmission times of a packet transmitted in the virtual link between two servers,
$P_R$ a precision datum corresponding to the maximum acceptable gap between the time reference of two computer devices,
D a maximum drift rate of the internal clock of a critical computing device; and
M the number of critical computing devices of said assembly.

3. The synchronization method according to claim 1, wherein each critical computing device also comprises a module for managing synchronization failure(s) that may be detected during the implementation of said method, and in which the method comprises, during a current period, prior to the reception of at least one synchronization message and the estimate of the current time of the sending server:

the transmission, by the time management module of the current critical computing device, to its own failure management module, of any information, associated with a module for managing failures of at least one sending server separate from the current critical computing device, and, received during the preceding period, and the performance of each action, not yet performed received from its own failure management module.

4. The synchronization method according to claim 1, the current critical computing device being a current server from the plurality of servers, each server being connected to each other server and each client by a virtual synchronization link, an wherein, during an initialization phase, the method comprises, prior to the reception of at least one synchronization message and the estimate of the current time of the sending server:

the determination of a time reference of the current server by applying a predetermined affine function to the value of the internal clock of the current server at the current moment, the affine function being associated with a factor and a shift, the values of which are initiated beforehand at predetermined initial values, and the sending of a synchronization message comprising an identification field representative of the initialization phase of the time management modulo of the current server and comprising the time reference of the current server.

5. The synchronization method according to claim 4, wherein successively to the estimate of the current time of the sending server carried out, for each received synchronization message comprising an identification field representative of the initialization phase of a separate sending server, and implemented once a first predetermined number of synchronization messages is received, is achieved, the method comprises:
determining a new time reference corresponding to the current maximum time obtained from current times associated with each message,
updating the factor and the shift of the affine function as a function of said new time reference, and
starting the operational phase of the time management module of the current server.

6. The synchronization method according to claim 4, wherein successively to the estimate of the current time of the sending server carried out, for each received synchronization message comprising an identification field representative of the operational phase of a separate sending server, and implemented once a second predetermined number of synchronization messages is received, is achieved, the method comprises:
determining a new time reference corresponding to the current average time obtained from current times associated with each message,
updating the factor and the shift of the affine function as a function of said new time reference, and
starting the operational phase of the time management module of the current server.

7. The synchronization method according to claim 1, the current critical computing device being a current server from the plurality of servers, each server being connected to each other server and each client by a virtual synchronization link,
wherein, during the operational phase, the method comprises:
for each received synchronization message comprising an identification field representative of the operational phase of a separate sending server:
if the reception instant of the message is more than two periods earlier than the current instant, sending a piece of information representative of an anomaly to the failure management module of the current client and stopping of the processing of the message,
otherwise, said estimate of the current time associated with said message,
determining a new time reference corresponding to the current average time obtained from the current time of the current server and current times associated with each message,
updating the factor and the shift of the affine function as a function of said new time reference, and
sending a synchronization message comprising an identification field representative of the operational phase of the current server and containing said time reference of the current server.

8. The synchronization method according to claim 1, the current critical computing device being a current client from the plurality of clients, each client being connected to each server from the plurality of servers by a virtual synchronization link,
wherein, during an initialization phase, successively to the estimate of the current time of the sending server carried out from the first received synchronization message comprising an identification field representative of the operational phase of a separate sending server, the method comprises:
updating the time reference of the current client equal to the current time associated with said message,
initializing initial factor and shift values of an affine function applicable to the value of the internal clock of the current client, and
starting the operational phase of the time management module of the current client.

9. The synchronization method according to claim 1, the current critical computing device being a current client from the plurality of clients, each client being connected to each server from the plurality of servers by a virtual synchronization link,
wherein, during an operational phase, the method comprises:
for each received synchronization message comprising an identification field representative of the operational phase of a separate sending server:
if the reception instant of the message is more than two periods earlier than the current instant, sending a piece of information representative of an anomaly to the failure management module of the current client and stopping of the processing of the message,
otherwise, said estimate of the current time associated with said message,
if the absolute value of the difference between, on the one hand, a time reference of the current client obtained by applying an affine function to the value of the internal clock of the current client at the current moment, and on the other hand the average current time obtained from current times associated with each message is above a predetermined precision threshold, the sending of information representative of an anomaly to the failure management module of the current client,
determining a new time reference corresponding to the current average time obtained from current times associated with each message, and
updating the factor and the shift of the affine function of the current client as a function said new time reference.

10. A system for synchronizing a set of interconnected critical computing devices, with a communication network of a vehicle, and each comprising a time management module, the set of critical computing devices comprising at least one plurality of time reference servers, and a plurality of clients, each critical computing device being connected to at least one other critical computing device by a virtual link, each termination point of a virtual link being associated with a minimum value and a maximum value of transmission time for a data packet over said virtual link,
the time management module of each current critical computing device being able to carry out and periodically reiterate at least:
receiving at least one synchronization message transmitted by a sending server separate from said current critical computing device, each message being associated with a reception instant and comprising at least one time reference determined by said sending server,
for each received synchronization message, estimating the current time of the sending server from a quintuplet of parameters comprising:
said time reference,
a value of the internal clock of the current critical computing device at the current instant, a value of the internal clock of the current critical computing device at the reception instant, and the minimum value and the maximum value of transmission time associated with the virtual link between the sending server and the current critical computing device.

* * * * *